United States Patent
Cecconi (10) Patent No.: US 8,698,436 B2
(45) Date of Patent: Apr. 15, 2014

(54) BALANCED CONFIGURATION RELAY DEVICE WITH IMPROVED PERFORMANCES

(75) Inventor: Pietro Cecconi, Milan (IT)

(73) Assignee: Electrica S.r.l., Milan (IT)

( * ) Notice: Subject to any disclaimer, the term of this patent is extended or adjusted under 35 U.S.C. 154(b) by 124 days.

(21) Appl. No.: 13/558,395

(22) Filed: Jul. 26, 2012

(65) Prior Publication Data

US 2013/0026957 A1    Jan. 31, 2013

(30) Foreign Application Priority Data

Jul. 28, 2011  (IT) .............................. MI2011A1412

(51) Int. Cl.
*H02P 1/16* (2006.01)
*H01H 51/00* (2006.01)

(52) U.S. Cl.
USPC ............ 318/400.3; 318/160; 318/170; 335/6; 335/35; 335/36; 335/171

(58) Field of Classification Search
USPC ........ 318/400.3, 160, 790; 335/6, 35, 171, 36
See application file for complete search history.

(56) References Cited

U.S. PATENT DOCUMENTS

| | | | |
|---|---|---|---|
| 2,852,639 A | | 9/1958 | Nelsen |
| 2,891,199 A | | 6/1959 | Ugon |
| 5,587,693 A | | 12/1996 | Fear |
| 7,423,228 B1 * | 9/2008 | White et al. ........... 200/61.45 R |
| 7,557,682 B2 * | 7/2009 | Ricciuti et al. .................. 335/64 |
| 7,623,010 B2 * | 11/2009 | Liu .................................... 335/6 |
| 7,804,038 B2 * | 9/2010 | Bortolus et al. .............. 218/140 |
| 8,138,862 B2 * | 3/2012 | Mueller et al. ................. 335/172 |
| 8,232,488 B2 * | 7/2012 | Haendler et al. ........... 200/50.12 |
| 8,410,876 B2 * | 4/2013 | Heckenkamp et al. ........... 335/6 |
| 2008/0018422 A1 * | 1/2008 | Claeys et al. .................... 335/35 |
| 2008/0117006 A1 * | 5/2008 | Claeys et al. .................... 335/35 |
| 2008/0129429 A1 * | 6/2008 | Ricciuti et al. .................. 335/38 |
| 2008/0258850 A1 * | 10/2008 | Claeys et al. .................... 335/36 |
| 2009/0102586 A1 * | 4/2009 | Bush et al. ..................... 335/153 |
| 2009/0242361 A1 * | 10/2009 | Haendler et al. ........... 200/43.02 |
| 2012/0313737 A1 * | 12/2012 | Iwamoto et al. .............. 335/185 |

OTHER PUBLICATIONS

Italian Search Report, dated Mar. 1, 2012, from corresponding IT application.

* cited by examiner

*Primary Examiner* — Paul Ip
(74) *Attorney, Agent, or Firm* — Young & Thompson (57) ABSTRACT

A relay device includes: an electromagnet constituted by a metallic core and an electrical winding associated therewith; and a mobile anchor associated with a traction spring and suitable for oscillating around a respective axis of oscillation in response to the combined action of an electromagnetic attraction force, generated by the electromagnet and intended to attract the anchor towards the core, and an elastic recovery force, exerted by the spring and intended to move the anchor away from the core and make it return to an initial position, so as to open or close selectively via the anchor a contact or switch of an external electrical circuit, wherein the anchor has a balanced or equilibrium configuration in which its center of gravity is arranged substantially along the axis of oscillation, and thereby the masses of various portions anchor portions are distributed in a balanced manner around the same axis of oscillation.

15 Claims, 5 Drawing Sheets

BALANCED CONFIGURATION RELAY DEVICE WITH IMPROVED PERFORMANCES

FIELD OF THE INVENTION

The present invention relates in general to the sector of electromechanical relays and contactors and of similar devices, and more particularly relates to a relay which has and is characterised by improved performances compared to those already known and in use.

PRIOR ART

Contactors or relays are electromechanical devices or components, for a long time known and used in the art, which, in response to the command of an electrical current, are suitable for closing or opening selectively an electrical contact, i.e. they are suitable for operating substantially like switches commanded, instead of in manual mode, by a pulse of electrical current.

These relays are available in a wide variety of types, forms and models, and are provided for use in a vast range of applications, for example for the starting of electric motors or in the field of industrial power controls, in transport and in the distribution of electrical energy, and yet other applications, as is well known to persons skilled in the art.

Since the features of these relays and contactors are widely known, only the basic fundamental features thereof will be described, useful for the understanding of the present invention.

More particularly a relay is mainly made up of an electromagnet suitable for generating, in response to the command of an electrical current, an electromagnetic force, which in turn attracts a metallic anchor, moving between two end positions, so as to open or close a contact of an external electrical circuit, which in this way is commanded by the same relay.

Figure 5:
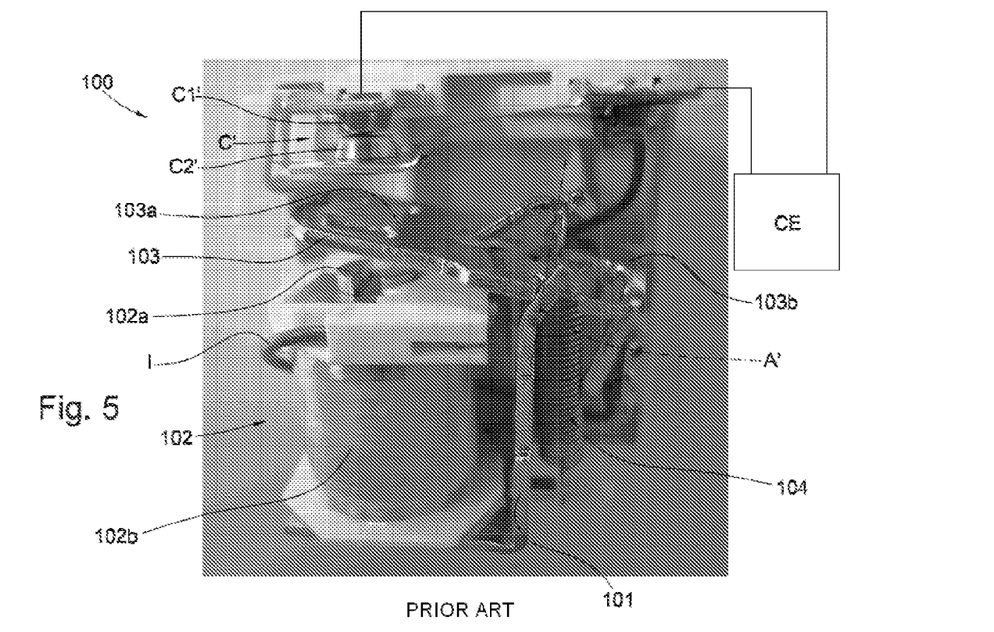
FIGS. 5 and 6 are two photographic views, from different observation points, of a conventional relay in accordance with the prior art.
Figure 6:
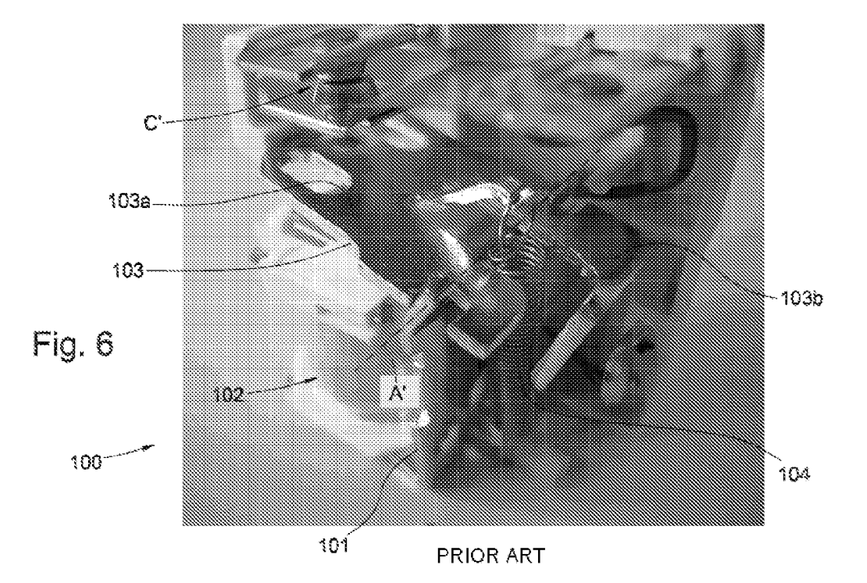

For completeness, FIGS. 5 and 6 show an example of relay of conventional type, denoted by 100, comprising a support structure or base frame 101, made up of a leaf of metal sheet bent into an L shape; an electromagnet 102, mounted on the frame 101 and in turn made up of a metallic core 102a and an electrical winding or coil 102b wound around the magnetic core 102a; and a mobile anchor or element 103.

Figure 7A:
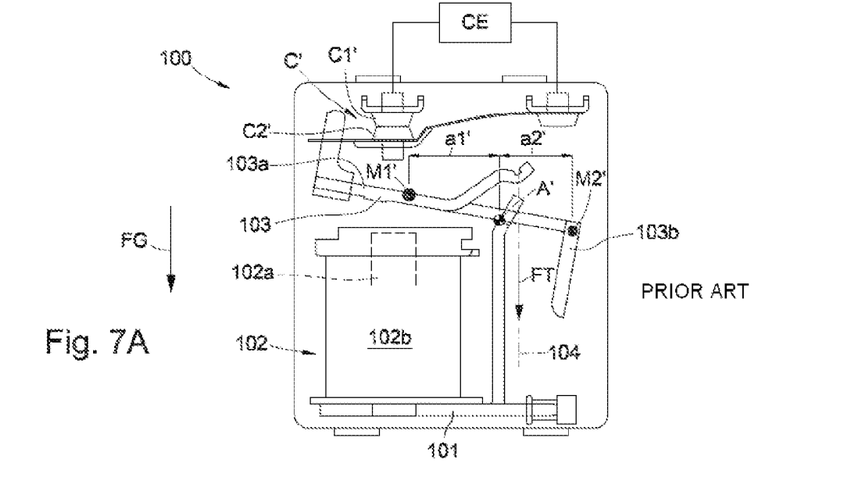
FIGS. 7A and 7B are two example diagrams of the conventional relay of FIGS. 5 and 6, in a first and in a second installation configuration respectively.
Figure 7B:
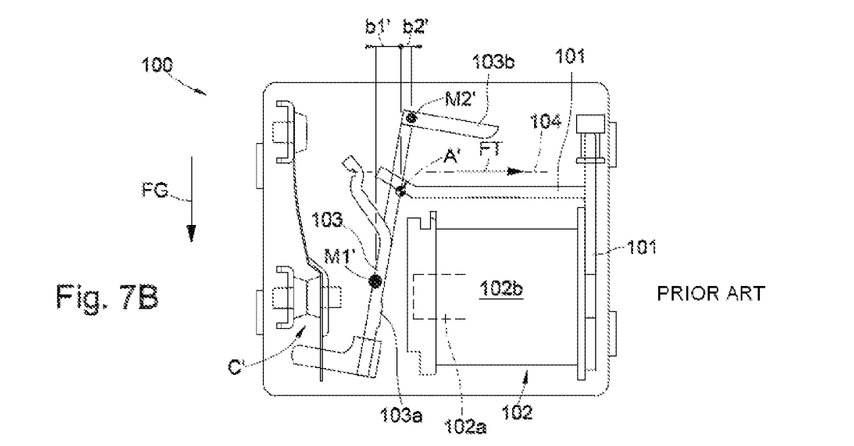
Figure 8:
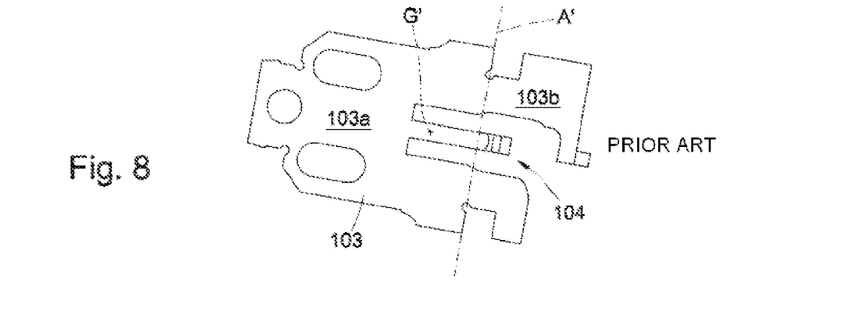
FIG. 8 is a schematic plan view of an anchor of the conventional relay of FIGS. 7A and 7B.

As also schematised in FIGS. 7A, 7B and 8, the mobile anchor 103 has conventional configuration and shape and is in turn made up of a flat metallic lamina, which rests in a respective central zone, defining an axis of oscillation A', on the support structure 101, and has a first front portion 103a, adjacent to the electromagnet 102, and a second rear portion 103b, associated with a traction spring 104, with these two portions 103a and 103b arranged on opposite sides and ideally separated from the axis of oscillation A'.

In the functioning of the relay 100, the electromagnet 102 is actuated by supplying the coil 102b with a pulse of electrical current, so as to activate a corresponding electromagnetic force which is intended to attract the anchor 103 towards the metallic core 102a of the electromagnet 102, making it rotate around the axis of oscillation A', in contrast to the elastic action of the spring 104, so that the anchor 103 opens a contact C', for example made up of two pads C1', C2', included in an external electrical circuit schematised with a block CE.

When the pulse of electrical current has ended, the electromagnetic force is annulled, so that the elastic force applied by the spring 104 makes the anchor 103 rotate around the axis A' and returns it into the initial starting position, so as to close and restore the initial conditions of the contact C.

As can be seen from the configuration of the conventional anchor 103, as shown in FIG. 8, the respective portions 103a and 103b, flat and ideally separated from the axis of oscillation A', have different extensions and therefore also different masses.

More particularly the portion 103a, adjacent to the metallic core 102a, has a greater extension with respect to the portion 103b, arranged in the zone of the spring 104, so that the mass of this portion 103a is greater than that of the portion 103b.

In other words the global mass of the anchor 103 is not in equilibrium or balanced with respect to the axis of oscillation A', but is more concentrated on the side of the electromagnet 102 with respect to the side of the spring 104, so that through the effect of this imbalance the centre of gravity G' of the anchor 103 is not arranged along the axis of oscillation A', but is displaced inside the zone of the portion 103a, as shown in FIG. 8.

The inventor has perceived, and ascertained experimentally, that, in conventional relays, this unbalanced or non-equilibrium distribution of the mass of the anchor with respect to the respective axis of oscillation is not irrelevant but may influence the performances of the relay, and more particularly may have significant effects on the behaviour and the dynamic response of the same anchor, as a function of the position and of the orientation in space whereby the relay is installed.

In fact, due to this imbalance of the overall mass of the anchor with respect to the relative axis of oscillation, the anchor could react dynamically to the system of forces whereto it is subjected, i.e. the self weight of the various portions into which the anchor can be broken down, the electromagnetic force exerted by the electromagnet and the elastic mechanical one applied by the spring, in a different way and with different reaction times according to the specific configuration and orientation in space whereby the anchor is mounted.

More particularly, the weight force of the various portions of the anchor which are arranged around the respective axis of oscillation applies an overall moment, in relation to this axis of oscillation, which varies considerably according to the spatial arrangement and configuration of installation of the relay, so that the dynamic response of the anchor is inevitably affected and conditioned by this spatial arrangement of installation of the relay.

In brief, the sum of these effects, caused by the unbalanced configuration of the anchor, could, for example, determine inconstant and repetitive times of opening or closure of the contact, yet to some extent dependent on the configuration of installation and mounting of the relay.

It is also underlined that the previous observations, at which the inventor has arrived, are confirmed and are reflected in a certain sense also in the prior art.

In fact the relays available on the market are usually designed to be installed in a certain position and orientation in space, in order to function correctly, and account has to be taken of this specific position and orientation in space of the relay in the choice of the most suitable relay to be installed.

Therefore this position of installation is already provided and established at the production stage, in order to allow the user to choose the appropriate relay.

Obviously the fact that different models have to be chosen according to the spatial orientation of the relay implies additional costs and also contrasts with the need for standardisation of the products.

SUMMARY OF THE INVENTION

Therefore a first object of the present invention is that of improving concretely and tangibly the features of the relay devices currently known and in use, and more particularly to make a relay which exhibits performances, especially as regards the times of activation, i.e. of opening and closure of the contact or of the contacts commanded by the relay, which are as constant and repeatable as possible, and therefore, unlike what often happens in conventional relays, are not conditioned by the position and orientation in space whereby the relay is installed.

A further object, connected to the previous one, is that of making a relay which is as far as possible universal and independent from its specific position and orientation in space, i.e. is suitable for being installed in any spatial arrangement, without this influencing its performances, unlike conventional relays which instead are often constrained to an installation according to a specific orientation and position, provided and established at the production stage.

The above objects can be considered achieved in full by the relay having the features disclosed by the first independent main claim.

Particular embodiments of the relay of the invention are also defined by the dependent claims.

Numerous advantages are associated with the new relay corresponding to the present invention, such as those listed herein below, purely by way of an example:
  lack of sensitivity of the operating parameters of the relay and of the relative dynamic response, in particular of the electrical voltage of activation and of the time of reaction of the anchor for opening or closing the circuit of the response of the relay, to the arrangement of installation of the relay;
  constancy and repeatability of the operating parameters of the relay and of the respective dynamic response for any arrangement of installation of the relay;
  flexibility of mounting, given that the relay can be installed in any position and orientation in space, without being constrained to a specific position and orientation as is usually necessary for known relays.

BRIEF DESCRIPTION OF THE DRAWINGS

These and other objects, features and advantages of the present invention will be made clear and evident from the following description of one of its preferred embodiments, given purely by way of an example with reference to the accompanying drawings, in which.

DESCRIPTION OF A PREFERRED EMBODIMENT OF THE RELAY OF THE INVENTION

Referring to FIGS. 1, 2, 3A and 3B of the drawings, a relay device, also referred to simply as relay, having the features of the present invention, is denoted overall by 10.

In detail the relay 10 comprises:
  an external shell 20;
  a support frame or structure 11, integral with the external shell 20;
  an electromagnet 12 supported by the support structure 11 and in turn made up of a metallic core 12a and an electrical winding 12b wound around the metallic core 12a;
  a mobile anchor 13 associated with the electromagnet 12;
  elastic means, denoted by 14, associated with the anchor 13 and in particular made up of a traction spring; and
  a contact (C) for the opening or closure of an electrical circuit CE external to the relay 10.

Figure 1:
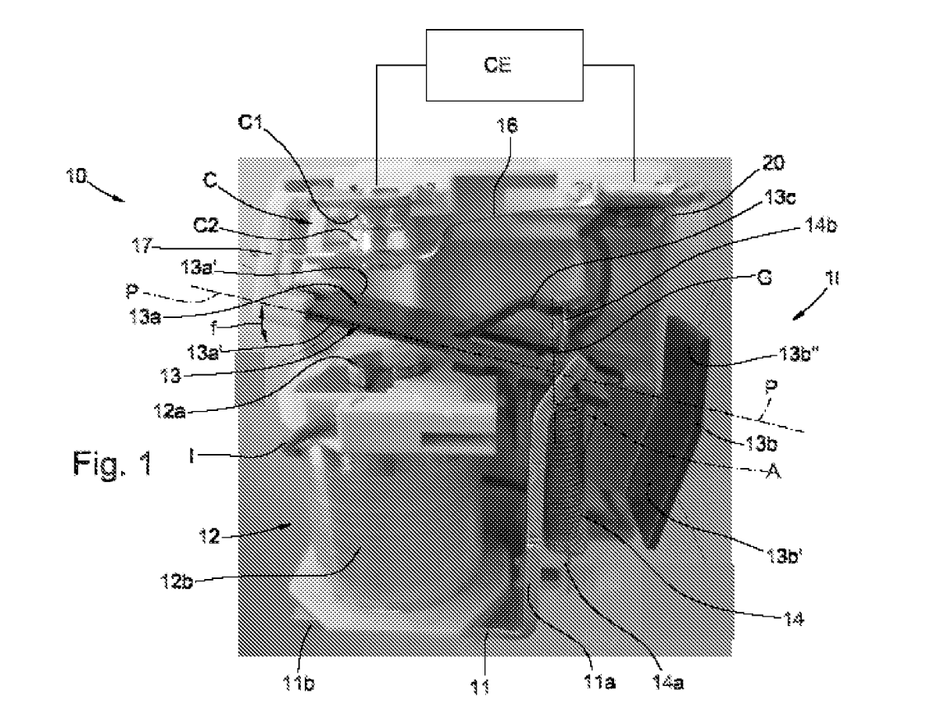
FIG. 1 is a first photographic view of a relay in accordance with the present invention.
Figure 2:
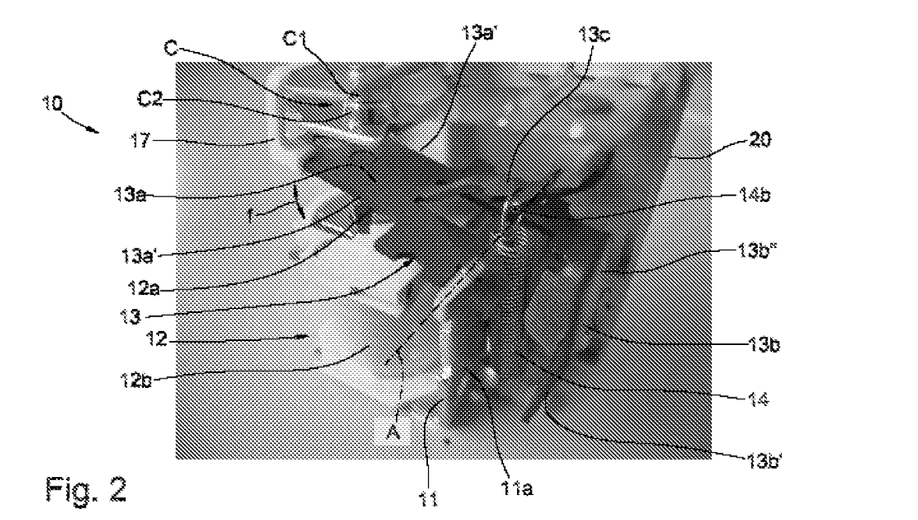
FIG. 2 is a second photographic view, from a different observation point, of the relay of FIG. 1.

The support structure 11 has the function of supporting the various parts of the relay 10 and is made with a leaf of sheet metal appropriately shaped and subsequently bent into an L configuration, exhibiting two flaps 11a and 11b.

The anchor 13 is mounted on an end edge of one of the flaps, more particularly the flap 11a, of the support structure 11, and is suitable for oscillating, pivoting on this end edge, which therefore corresponds to the axis of oscillation A of the same anchor 13, in relation to the support structure 11, as indicated by a double arrow f.

Figure 4:
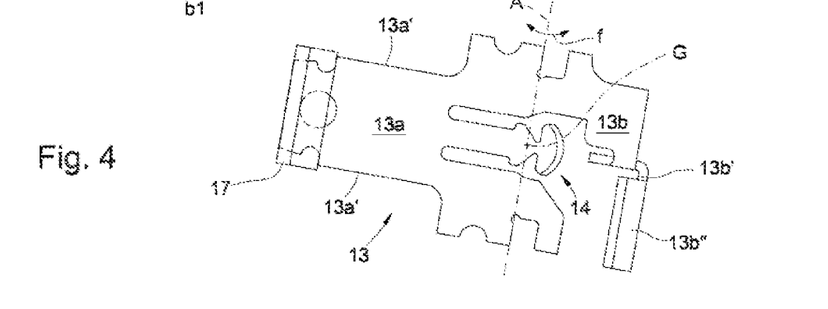
FIG. 4 is a schematic plan view of an anchor of the relay of the invention of FIGS. 3A and 3B.

The anchor 13 is also made, like the support frame 11, with a leaf of sheet metal appropriately shaped and bent, and has a first front portion, denoted by 13a, adjacent to the metallic core 12a of the electromagnet 12, and a second rear portion 13b, arranged on the side of the traction spring 14, wherein these two portions 13a and 13b are ideally separated from the axis of oscillation A of the anchor 13.

Figure 3A:
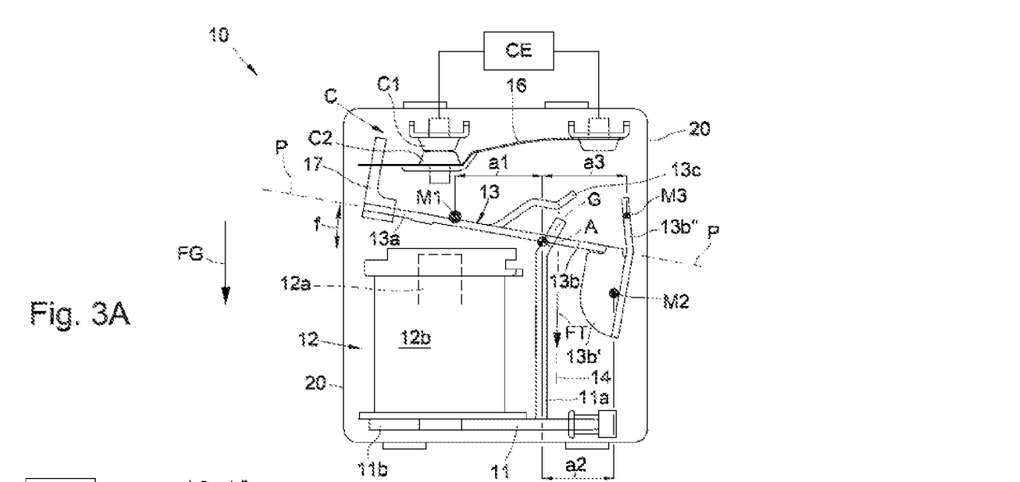
FIGS. 3A and 3B are two example diagrams of the relay of FIGS. 1 and 2, in accordance with the present invention, in a first and in a second installation configuration respectively.
Figure 3B:
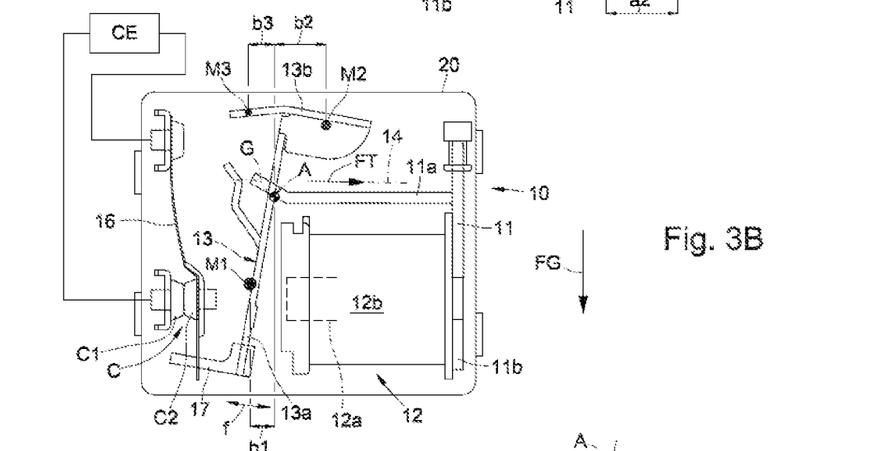

The traction spring 14 is connected at a respective end 14a to the support frame 11 and at the opposite end 14b to a tongue 13c of the anchor 13, and is suitable for applying a corresponding traction force FT, schematised with an arrow in FIGS. 3A and 3B, intended to maintain distanced the front portion 13a of the anchor 13 from the metallic core 12a of the electromagnet 12.

The contact C, included in the relay 10, comprises a first pad C1 and a second pad C2, both metallic, whereof the first metallic pad C1 is fixed and is mounted on a structure in plastic integral with the shell 20, while the second metallic pad C2 is mobile and is mounted on one end of a flexible lamina 16, also metallic, in turn fixed at the opposite end to a plastic structure integral with the shell 20.

The contact C2, mobile, is suitable for being actuated by means of a plastic element 17 attached at the end by the portion 13a of the anchor 13, adjacent to the metallic core 12a.

The metallic pad C2 is held normally in contact, i.e. with the relay not excited, with the fixed pad C1, by the elastic action exerted by the lamina 16, so as to close the external electrical circuit CE associated with the relay 10.

In normal rest conditions, with the relay 10 not activated and the electromagnet 12 not supplied with the electrical current I, therefore also with the contact C closed, the anchor 13 is placed in an initial or rest position, wherein the respective front portion 13a is held distanced from the metallic core 12 by the elastic force exerted by the spring 14 on the rear portion 13b of the anchor 13.

The relay 10 is activated by supplying the electromagnet 12 with a pulse of electrical current I, so that in response the electromagnet 12 generates a corresponding electromagnetic force which attracts the front portion 13a of the anchor 13 towards the metallic core 12a, in contrast to the elastic force applied by the spring 14 on the rear portion 13b.

Therefore the anchor 13 reacts to this electromagnetic force generated by the electromagnet 12 by rotating around the respective axis of oscillation A and consequently commanding, by means of the plastic element 17, the pad C2 of the contact C, in such a way as to detach it from the pad C1, in contrast to the elastic action exerted by the lamina 16, so that the contact C opens.

On ceasing of the pulse of electrical current I, immediately the electromagnetic force generated by the electromagnet 12 also ceases and is annulled, so that the anchor 13, no longer attracted towards the metallic core 12a but subjected solely to the elastic force of traction FT applied thereon by the spring 14, rotates in a direction opposite to the previous one around the axis of oscillation A and returns into the initial or rest position.

Consequently the pad C2 also returns into contact with the pad C1 in such a way as to close the contact C associated with the external electrical circuit CE.

According to a basic feature of the prevent invention the anchor 13 of the relay 10 is configured in such a way as to have a configuration and a distribution, of its overall mass, which is balanced and in equilibrium in relation to the axis of oscillation A, i.e., in other words, a configuration wherein the centre of mass or centre of gravity G of the same anchor 13 is arranged substantially along this axis of oscillation A, and therefore the masses of the various portions of the anchor 13, that is to say of the first front portion 12a and of the second rear portion 12b, are distributed in a balanced way around this axis of oscillation A.

Therefore, through the effect of this balanced configuration of the mass of the anchor 13 and therefore of the arrangement of the respective centre of gravity G along the axis of oscillation A, the force of gravity, i.e. the self weight of the anchor 13, has a null moment with respect to the axis of oscillation A, whatever the orientation and the position in space of the same anchor 13, i.e. whatever the arrangement of installation of the relay 10.

In order to achieve this configuration of balancing and equilibrium in relation to the axis of oscillation A, characterising the relay 10 of the present invention, the anchor 13, which, as mentioned previously, is made up of a leaf of bent sheet metal, is appropriately shaped and dimensioned in the zone of the respective portions 13a and 13b.

More particularly the front portion 13a is made up of a flat tongue which has two opposite cuts 13a', formed in the end zone of the tongue distant from the axis of oscillation A, wherein these cuts 13a' have the purpose of lightening the total mass of the portion 13a.

The rear portion 13b has in turn a lower part 13b' and an upper part 13b" separated ideally by a plane P corresponding to the plane of extension of the front portion 13a of the anchor 13, wherein the lower rear part 13b' consists of an L-shaped bent arm and the upper rear part 13b" consists of a flat tongue which extends from the L-shaped bent arm and has a configuration slightly bent towards the axis of oscillation (A).

The diagrams of FIGS. 3A and 3B, which show the relay 10 respectively in a first configuration of installation and in a second configuration of installation, rotated in relation to the first through 90°, illustrate clearly this special configuration of balancing and equilibrium, characterising the relay 10 of the invention, of the anchor 13 in relation to the respective axis of oscillation A.

In particular the masses of the three parts whereof the anchor 13 is composed, i.e. the front portion or tongue 13a, the lower part 13b' and the upper part 13b" of the rear portion 13b, are denoted respectively by M1, M2 and M3, and supposed to be concentrated in points corresponding to the centre of gravity or centre of mass of each of these three parts.

These three masses M1, M2 and M3 correspond in turn to three respective weight forces acting downwards in the direction of the force of gravity, in turn schematised in FIGS. 3A and 3B with an arrow FG.

As can be seen from the diagram of FIG. 3A, relating as mentioned to a first position of the relay 10, the moment of the mass M1, i.e. of the corresponding weight force, with respect to the axis of oscillation A, is balanced by the moments applied by the masses M2 and M3, again in relation to the axis of oscillation A, i.e. M1*a1=M2*a2+M3*a3, so that the centre of gravity G of the anchor 13 is placed along the axis of oscillation A and the various masses M1, M2 and M3 apply a total null moment in relation to the latter.

This balanced distribution of the masses M1, M2 and M3 in relation to the axis of oscillation A corresponds to and can also be defined as a star-like distribution and configuration of the mass of the anchor 13 around the respective axis of oscillation A, in which the first concentrated mass M1 corresponds to the mass of the front portion 13a of the anchor 13 and the other two concentrated masses M2, M3 correspond respectively to the mass of the first lower portion 13b' and to the mass of the second upper portion 13b" of the rear portion 13b of the anchor 13, and with the first lower portion 13b' and the second upper portion 13b" of the rear portion 13b of the anchor 13 arranged at opposite sides in relation to the plane of extension P of the tongue constituting the front portion 13a of the anchor 13.

Also when the relay 10 is rotated through 90°, as schematised in FIG. 3B, with respect to the configuration of FIG. 3A, the condition of equilibrium and balancing of the anchor 13 with respect to the axis of oscillation A does not change.

In fact the overall moment of the masses M1, M2 and M3, i.e. of the corresponding weight forces, with respect to the axis of oscillation A, continues to be null, as expressed by the formula: M1*b1+M3*b3=M2*b2.

In other words, thanks to this balanced distribution and configuration of the mass of the anchor 13, the total moment of the masses into which the total mass of the anchor 13 can be broken down is always null with respect to the axis of rotation A, whatever the arrangement and the orientation in space of the anchor 13, i.e. of the relay 10.

On the contrary, in conventional relays, the centre of gravity of the mobile anchor is not arranged along the respective axis of oscillation, and therefore also the moment, in relation to this axis of oscillation, of the different masses into which the total mass of the anchor can be broken down, is not null but varies according to the arrangement of installation of the relay.

More particularly, as can be seen from the diagrams of FIGS. 7A, 7B and 8 relating to the relay 100, of the conventional type, shown in FIGS. 5 and 6, therefore comprising a non-balanced anchor 103, the centre of gravity G' of this anchor 103 is not placed along the relative axis of oscillation A', but inside the front portion 103a, adjacent to the metallic core 102a of the electromagnet 102.

Consequently the overall moment, with respect to the axis of oscillation A', of the various masses into which the total mass of the conventional anchor 103 can be broken down, i.e. of the mass M1' corresponding to the front portion 103a and of the mass M2' corresponding to the rear portion 103b, is not null, as expressed by the formula: M1'*a1≠M2'*a2'.

Also when, as shown in FIG. 7B, the convention relay 100 is installed in a configuration of installation rotated through 90° with respect to that of FIG. 7A, the total moment of the masses M1' and M2' is not null, as expressed by the formula M1'*b1'≠M2'*b2'.

Figure 9:
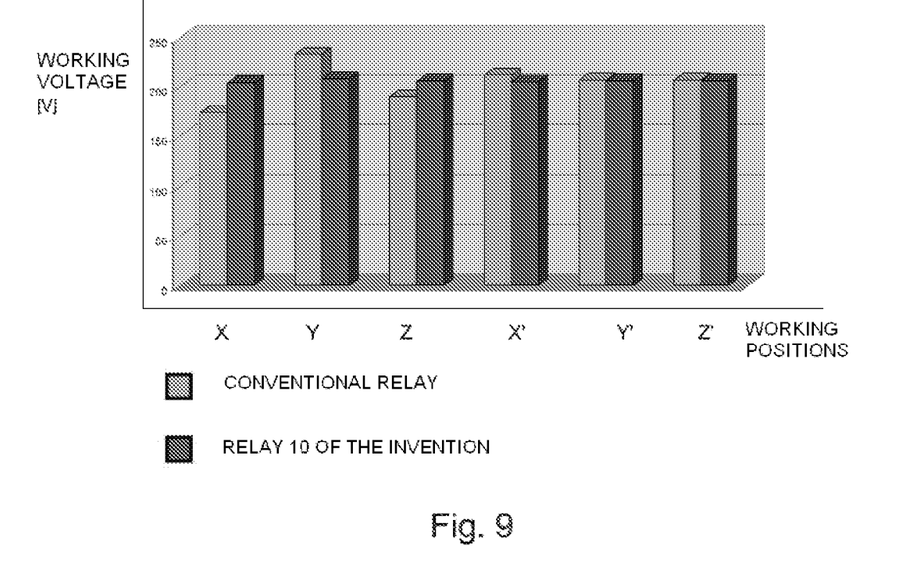
FIG. 9 is a working diagram which compares the relay of the invention and a conventional relay.

As confirmation and support for the innovative features of the relay of the present invention, determined by the special balanced configuration of the respective anchor 13, the diagram of FIG. 9 compares the relay 10 of the invention, characterised in fact by a balanced anchor, with a conventional relay, comprising a non-balanced anchor, and in particular the respective working voltage of activation as a function of the six fundamental working arrangements, corresponding to the three spatial directions X, Y, Z, and to the opposite directions X', Y', Z', whereby the two relays can be installed.

As can be seen from this diagram, while the relay 10 of the invention has features and parameters of actuation, for example in terms of supply voltage, which are substantially repeatable and non-sensitive to the various spatial arrangements of the relay, the conventional relay has values which vary appreciably between one operating position and the other of the relay.

It is therefore clear from the description given that the present invention achieves in full the objects set, and more particularly proposes a relay which has working features and performances which are independent and are not influenced by the specific spatial configuration whereby the relay is installed.

The relay 10 of the invention, thanks to these features thereof, is suitable for being advantageously adopted in a plurality of applications.

Figure 10:
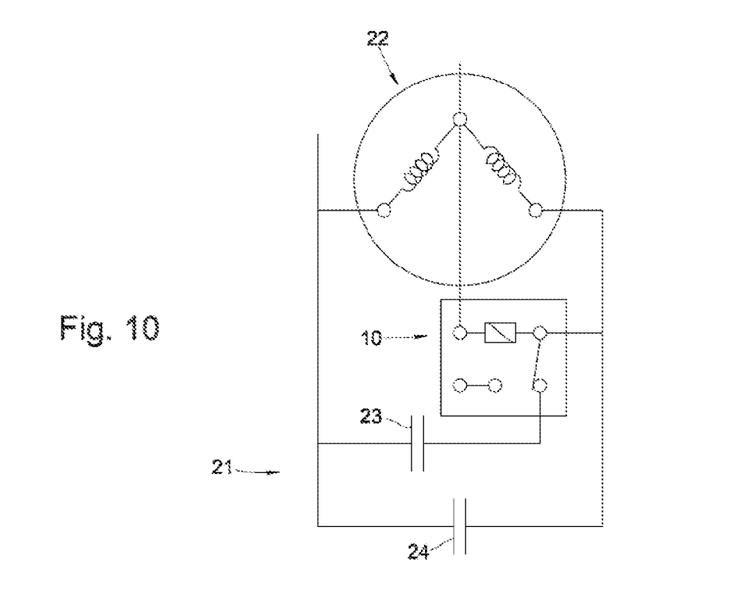
FIG. 10 is a wiring diagram which shows an application of the relay of the invention for starting a motor.

By way of an example FIG. 10 shows an example of application wherein the relay 10 is associated with a starting circuit, denoted overall by 21, of an electric motor 22, wherein the starting circuit 21 comprises a first capacitor 23, suitable for intervening in the start-up phase of the electric motor 22, and a second capacitor 24, arranged in parallel with respect to said first capacitor 23 and suitable for operating, after the start-up phase, during the normal working of the electric motor 22 in the steady state.

Variants

Naturally, without detriment to the basic concepts and principle of the present invention, the embodiments and the details of manufacture of the relay proposed here may be widely varied with respect to what has been described hitherto and illustrated, without thereby departing from the scope of the same invention.

For example the contact C, instead of being normally closed, as described with reference to the embodiment 10 of the relay, can be normally open, i.e. with the respective pads C1 and C2 distanced one from the other, when the relay is not excited.

Moreover the concept of the present invention may be applied both to voltage-controlled relays, whereto reference was made previously, and to current-controlled relays.

More particularly, in the case of current-controlled relays, the state of the art provides often for the use of an additional small spring, with respect to the usual one, for the return of the oscillating anchor and also suitable for applying an elastic force on the anchor, which is calibrated as a function of the specific position of installation of the relay, in such a way as to regulate the response of the relay and make it constant when this installation position is varied.

Now the relay of the present invention allows advantageously the elimination of this additional small spring, as well as its possible calibration.

In fact the new relay, thanks to the balanced configuration of the respective anchor, is such as to render uninfluential, as explained previously, the specific position of installation of the relay on its operative response, understood as reaction times and/or activation current.

The invention claimed is:

1. Relay device (10) comprising:
a support structure (11);
an electromagnet (12) supported by said support structure (11) and in turn comprising a metallic core (12a) and an electrical winding (12b) associated with said metallic core;
a mobile anchor (13) associated with said electromagnet (12); and
elastic means (14) associated with said anchor,
wherein said mobile anchor (13) is suitable for oscillating (f), around a respective axis of oscillation (A), through the effect of the combined action of an electromagnetic attraction force, generated by the electromagnet (12) and intended to attract the anchor (13) towards said metallic core (12a), and an elastic recovery force (FT), exerted by said elastic means (14) and intended to move the anchor (13) away from the metallic core (12a), in order to open or close a contact (C, C1, C2) or a switch of an external electrical circuit (CE), and
wherein said anchor (13) has a first front portion (13a) and a second rear portion (13b), separated by said axis of oscillation (A), respectively adjacent to said metallic core (12a) and to said elastic means (14),
said relay device being characterised in that said anchor (13) has a balanced configuration in which the centre of mass or centre of gravity (G) of said anchor (13) is arranged substantially along said axis of oscillation (A), and therefore the masses (M1, M2, M3) of said first (13a) and second (13b) portion of said anchor (13) are distributed in a balanced manner around said axis of oscillation (A).

2. Relay device (10) according to claim 1, wherein the distribution of the mass of said anchor (13) around said axis of oscillation (A) corresponds to a star-like distribution of three concentrated masses (M1, M2, M3) around said axis of oscillation (A), in which a first concentrated mass (M1) corresponds to the mass of said front portion (13a) and the other two concentrated masses (M2, M3) correspond respectively to the mass of a first lower portion (13b') and to the mass of a second upper portion (13b") of the rear portion (13b) of said anchor (13), said first lower portion (13b') and said second upper portion (13b") being arranged at opposite sides with respect to a plane (P) corresponding to the area of extension of the front portion (13a) of the anchor (13).

3. Relay device (10) according to claim 1, wherein said mobile anchor (13) is made with a leaf of bent metal sheet,
wherein the first front portion (13a) of the anchor (13) is constituted by a substantially flat tongue, with two lightening cuts formed at the opposite sides of the end of said flat tongue, distant from said axis of oscillation (A),
wherein the second rear portion (13b) of the anchor (13) has in turn a lower part (13b') and an upper part (13b") separated by a plane (P) corresponding to the plane of extension of said front portion (13a) of the anchor (13), and wherein said lower part (13b') of the rear portion of the anchor (13) consists of an L-shaped bent arm and said upper part (13b") of the rear portion (13b) of the anchor (13) consists of a tongue which extends from said L-shaped bent arm and has a configuration slightly bent towards the axis of oscillation (A).

4. Relay device (10) according to claim 1, wherein said elastic means are constituted by a traction spring (14).

5. Relay device (10) according to claim 1, wherein the front portion (13a) of said anchor (13) is connected at one end, distant from said axis of oscillation (A), with an element or flexible lamina (16) associated with a mobile pad (C2) of said contact (C).

6. Relay device (10) according to claim 1, in combination with a starting circuit (21), for starting an electric motor (22), comprising a first capacitor (23) suitable for intervening in the start-up phase of the electric motor (22), and a second capacitor (24) arranged in parallel to said first capacitor (23) and suitable for operating, after the start-up phase, during the normal working of the electric motor (22) in the steady state.

7. Relay device (10) according to claim 2, wherein said mobile anchor (13) is made with a leaf of bent metal sheet,
    wherein the first front portion (13a) of the anchor (13) is constituted by a substantially flat tongue, with two lightening cuts formed at the opposite sides of the end of said flat tongue, distant from said axis of oscillation (A),
    wherein the second rear portion (13b) of the anchor (13) has in turn a lower part (13b') and an upper part (13b") separated by a plane (P) corresponding to the plane of extension of said front portion (13a) of the anchor (13), and
    wherein said lower part (13b') of the rear portion of the anchor (13) consists of an L-shaped bent arm and said upper part (13b") of the rear portion (13b) of the anchor (13) consists of a tongue which extends from said L-shaped bent arm and has a configuration slightly bent towards the axis of oscillation (A).

8. Relay device (10) according to claim 2, wherein said elastic means are constituted by a traction spring (14).

9. Relay device (10) according to claim 2, wherein the front portion (13a) of said anchor (13) is connected at one end, distant from said axis of oscillation (A), with an element or flexible lamina (16) associated with a mobile pad (C2) of said contact (C).

10. Relay device (10) according to claim 2, in combination with a starting circuit (21), for starting an electric motor (22), comprising a first capacitor (23) suitable for intervening in the start-up phase of the electric motor (22), and a second capacitor (24) arranged in parallel to said first capacitor (23) and suitable for operating, after the start-up phase, during the normal working of the electric motor (22) in the steady state.

11. Relay device (10) according to claim 1, wherein said elastic means are constituted by a traction spring (14).

12. Relay device (10) according to claim 3, wherein the front portion (13a) of said anchor (13) is connected at one end, distant from said axis of oscillation (A), with an element or flexible lamina (16) associated with a mobile pad (C2) of said contact (C).

13. Relay device (10) according to claim 3, in combination with a starting circuit (21), for starting an electric motor (22), comprising a first capacitor (23) suitable for intervening in the start-up phase of the electric motor (22), and a second capacitor (24) arranged in parallel to said first capacitor (23) and suitable for operating, after the start-up phase, during the normal working of the electric motor (22) in the steady state.

14. Relay device (10) according to claim 4, in combination with a starting circuit (21), for starting an electric motor (22), comprising a first capacitor (23) suitable for intervening in the start-up phase of the electric motor (22), and a second capacitor (24) arranged in parallel to said first capacitor (23) and suitable for operating, after the start-up phase, during the normal working of the electric motor (22) in the steady state.

15. Relay device (10) according to claim 5, in combination with a starting circuit (21), for starting an electric motor (22), comprising a first capacitor (23) suitable for intervening in the start-up phase of the electric motor (22), and a second capacitor (24) arranged in parallel to said first capacitor (23) and suitable for operating, after the start-up phase, during the normal working of the electric motor (22) in the steady state.

* * * * *